United States Patent
Oh

(10) Patent No.: US 7,117,307 B2
(45) Date of Patent: Oct. 3, 2006

(54) MEMORY CONTROLLING APPARATUS PERFORMING THE WRITING OF DATA USING ADDRESS LINE

(75) Inventor: Hak-su Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 435 days.

(21) Appl. No.: 10/676,262

(22) Filed: Oct. 2, 2003

(65) Prior Publication Data

US 2004/0123061 A1 Jun. 24, 2004

(30) Foreign Application Priority Data

Oct. 4, 2002 (KR) ...................... 10-2002-0060523

(51) Int. Cl.
*G06F 12/00* (2006.01)

(52) U.S. Cl. .......................... 711/118; 711/5; 711/149; 711/154; 711/169; 365/189.01; 365/189.05; 365/230.03; 365/230.08

(58) Field of Classification Search ................ 711/118, 711/169, 5, 149, 154; 365/189.01, 230.03, 365/189.05, 230.08
See application file for complete search history.

(56) References Cited

U.S. PATENT DOCUMENTS

| 4,851,991 | A | * | 7/1989 | Rubinfeld et al. ............. 711/5 |
| 5,091,845 | A | * | 2/1992 | Rubinfeld ...................... 714/2 |
| 5,237,670 | A | * | 8/1993 | Wakerly ..................... 710/100 |
| 5,313,594 | A | * | 5/1994 | Wakerly ..................... 710/105 |
| 5,732,278 | A | * | 3/1998 | Furber et al. ................. 712/41 |
| 5,818,789 | A | * | 10/1998 | Yung et al. ........... 365/230.06 |
| 6,438,634 | B1 | * | 8/2002 | Watanabe et al. ........... 710/110 |
| 6,748,505 | B1 | * | 6/2004 | Dakhil ....................... 711/167 |

* cited by examiner

*Primary Examiner*—Stephen C. Elmore
(74) *Attorney, Agent, or Firm*—Staas & Halsey LLP

(57) ABSTRACT

A memory controlling apparatus which receives from an upper module of a system a command to read data from a memory module or write data in the memory module and controls accessing the memory module in response to the command. The memory controlling apparatus includes a first transmitter which transmits an address of read data or write data and the write data to a memory module via an address line; and a second transmitter which transmits data read from a memory module to the upper module of the system via a data line.

28 Claims, 7 Drawing Sheets

MEMORY CONTROLLING APPARATUS PERFORMING THE WRITING OF DATA USING ADDRESS LINE

CROSS-REFERENCE TO RELATED APPLICATIONS

This application claims the benefit of Korean patent Application No. 2002-60523, filed on Oct. 4, 2002, in the Korean Intellectual Property Office, the disclosure of which is incorporated herein by reference.

BACKGROUND OF THE INVENTION

1. Field of the Invention

The present invention relates to controlling access to memory, and more particularly, to a memory controller which writes data on memory using an address line.

2. Description of the Related Art

Recently, synchronous dynamic random access memories (SDRAMs), such as double data rate synchronous dynamic random access memories (DDR SDRAMs) or Rambus DRAMs, have been welcomed as next-generation DRAMs and are also expected to dominate the future RAM market due to their high-speed data accessibility.

FIG. 1 is a diagram illustrating a conventional method of controlling the access of a DDR SDRAM when writing data on or reading data from the DDR SDRAM. In particular, FIG. 1 shows a memory controller 100 and a memory module 110.

Referring to FIG. 1, the memory controller 100 includes an address latch (AL) 101, a memory address queue (MAQ) 102, a data latch (DL) 103, a read data queue (RDQ) 104, and a write data queue (WDQ) 105.

The address latch 101 latches address data input into the memory controller 100.

The memory address queue 102 sequentially stores the address data transmitted from the address latch 101 and keeps the address data at a state where the address data is to be output. The address data include column address data and row address data, and the column address data and the row address data are sequentially output via a 12-bit address line.

The data latch 103 latches data input into the memory controller 100 from a system, i.e., written data, or data transmitted to the system, i.e., read data.

The read data queue 104 sequentially stores data read by the memory module 110 and keeps the stored data in a state ready to be output to the data latch 103.

The write data queue 105 sequentially stores the data transmitted from the data latch 103 that is to be stored in the memory module 110 and keeps the stored data in a state ready to be output to the memory module 110.

The memory module 110 includes a column address data register (CA) 111 which interprets the column address data provided by the memory controller 100, a row address data register (RA) 112 which interprets row addresses, a memory cell (MC) 113 which is comprised of a matrix of addresses interpreted by the column address data register 111 and the row address data register 112, a read data buffer (RD) 114 which temporarily stores data read from the memory cell 113, and a write data buffer 115 which temporarily stores data to be written on the memory cell 113.

The operation of the memory controller 100 in a typical memory device is as follows.

Address data and data that are input from a predetermined element 160 of a system 150, such as an interface or a central processing unit (CPU) via a system bus 170 are sequentially latched by the address latch 101 and the data latch 103, respectively. The latched address data are divided into a column address and a row address, and then the column address and the row address are encoded separately. Thereafter, the encoded column address and the encoded row address are sequentially stored in an address queue, i.e., the memory address queue 102. An upper module 180, a lower module 190, and a system element 160 are coupled to system bus 170.

Depending on whether the current mode is a data write mode or a data read mode, different manners for transmitting data can be adopted. In a data read mode, full-byte (8-byte or 16-byte) data is transmitted from the memory module 110 to the memory controller 100. The transmitted data is sequentially stored in the read data queue 104 of the memory controller 100. Thereafter, the stored data is output to a system bus via the data latch 103 and then provided to a micom, thus completing the reading of the corresponding data from the memory module 110. Thereafter, the memory controller 100 returns to an idle state and waits for the next mode shift.

When the memory controller 100 enters into a data write mode, two different manners of writing data on a memory, i.e., a partial-write manner and a full-write manner, can be considered. In most data transmission cases, except for direct memory access (DMA) transmission, the partial-write manner is adopted. In the full-write manner, all the bytes of data are written on the memory together, while in the partial-write manner, data are written on the memory in groups of a predetermined number of bytes.

For example, in the case of correcting 1-byte data using the partial-write manner, the memory controller 100 receives 8-byte or 16-byte data read from a place in a memory module 110 where the 1-byte data to be corrected is written via a data line and corrects the 1-byte data included in the 8-byte or 16-byte data. Thereafter, the memory controller 100 transmits the corrected 8-byte or 16-byte data to the memory module 110. When the writing of data in the memory module 110 is complete, the memory controller 100 returns to an idle state.

FIGS. 2A–2E are timing diagrams of signals generated when controlling the access of memory using the conventional method of controlling the access of a DDR SDRAM when writing data on, or reading data from, the DDR SDRAM, shown in FIG. 1. Referring to FIGS. 2A–2E, according to a predetermined memory access protocol, a row address and a column address of a place from which data will be read and a row address and a column address of a place on which data will be written are transmitted via an address line in response to the clock signal (CLOCK) of FIG. 2A. The column addresses and the row addresses of FIG. 2B are transmitted in response to a column address strobe (CAS) signal of FIG. 2D and a row address strobe (RAS) signal of FIG. 2C, respectively. The clock signal (CLOCK), the CAS signal, and the RAS signal are generated from an upper module of a system and then transmitted to a memory controlling apparatus of a lower module through the memory data bus of FIG. 2E.

When there is not much of a time interval provided between the time when the column and row addresses used to read data from the memory module 110 are generated and the time when the column and row addresses used to write data in the memory module 110 are generated, data (read data) read from the memory module 110 and then transmitted from the memory module 110 to the memory controller 100 via a data line and data (write data) to be written in the memory module 110, transmitted from the memory controller 100 to the memory module 110, may be congested in the data line. In order to prevent such a bottle neck phenomenon from occurring in a single data line, a sufficient interval should be provided between the time when a memory is accessed in order to read data from the memory module 110 and the time when the memory is accessed in order to write data in the memory module 110. In other words, one should wait for a sufficient amount of time until a current memory accessing process in one of a data read mode or a data write mode is completed before launching a following memory accessing process in the other mode. However, the general performance of a system may deteriorate due to the delay in data processing. In addition, in order to correct a predetermined portion of data stored in the memory module 110 in a partial-write manner, data to be modified is read from the memory module 110 in a full-read cycle. However, the process of reading the data to be modified from the memory module 110 in a full-read cycle may cause problems with the control of a read-write cycle, as well as a substantial delay in the entire process, equivalent to the read cycle, that may lengthen other transmission processes' standby time.

SUMMARY OF THE INVENTION

Accordingly, the present invention provides a memory controller which is capable of preventing a bottle neck phenomenon from occurring when reading data from or writing data on a memory, thereby enhancing the speed at which data is processed.

According to an aspect of the present invention, there is a memory controlling apparatus which receives, from an upper module of a system, a command to either read data from a memory module or write data in the memory module. The memory controlling apparatus also controls accessing the memory module in response to the command. The memory controlling apparatus includes a first transmitter, which transmits an address of read data, or an address of write data along with the write data itself, to a memory module via an address line; and a second transmitter, which transmits data read from a memory module to an upper module of a system via a data line.

In one aspect, the first transmitter includes an address queue which sequentially stores the address of the read data, or an address of the write data and the write data itself, and keeps the stored address and the stored data in a state ready to be transmitted to the memory module.

In a further aspect, the address of the write data is stored in an address queue of the first transmitter, and then the write data itself is stored in the address queue, and the stored address and the stored data are sequentially transmitted to the memory module via the address line.

Further, when writing data in a full-write manner, the write data is divided into bytes and all the bytes of the write data are sequentially transmitted from the address queue to the memory module at their corresponding addresses.

However, when writing data in a partial-write manner, only predetermined bytes of data transmitted from the upper module of the system corresponding to specific locations are stored in the address queue. These bytes of data are then transmitted to the memory module with their corresponding addresses stored in the address queue.

In this embodiment, the second transmitter includes a data queue which sequentially receives and stores data read from the memory module and keeps the stored data in a state ready to be transmitted to the upper module of the system.

The first transmitter includes an address queue which sequentially stores the address of the read data or the write data and the write data itself, and keeps the stored address and the stored data in a state ready to be transmitted to the memory module. The second transmitter includes a write data queue which sequentially receives data from the upper module of the system, stores the received data, and keeps the stored data in a state ready to be transmitted to the memory module via the address line, and a read data queue which sequentially stores read data received from the memory module via a data line and transmits the stored read data to the upper module.

When writing data, addresses stored in the address queue are transmitted to the memory module via the address line, and then data stored in the write data queue is transmitted to the memory module via the address line.

When writing data in a full-write manner, the write data is divided into bytes and all the bytes of the write data are sequentially transmitted from the address queue to the memory module at their corresponding address.

When writing data in a partial-write manner, only predetermined bytes of data transmitted from the upper module of the system corresponding to specific locations are stored in the address queue and then transmitted to the memory module with their corresponding addresses stored in the address queue.

According to another aspect of the present invention, memory controlling apparatus receives, from an upper module of a system, a command to read data from a memory module or write data in the memory module, and then controls accessing the memory module in response to the command. The memory controlling apparatus includes: an address latch which latches address data; a data latch which latches read data or write data; an address and write data queue which sequentially stores an address input from the address latch and write data from the data latch, and transmits the stored address and the stored data to a memory module via an address line; and a data queue which sequentially stores read data input from the memory module via a data line and transmits the read data to the upper module.

According to still another aspect of the present invention, a memory controlling apparatus receives, from an upper module of a system, a command to read data from a memory module or write data in the memory module and then controls the accessing of the memory module in response to the command. The memory controlling apparatus includes: an address latch which latches address data; a data latch which latches read data or write data; an address queue which stores an address input from the address latch and transmits the stored address to a memory module via an address line; a write data queue which stores write data input from the data latch and sequentially transmits the stored write data to the memory module via the address line; and a read data queue which sequentially stores read data input from the memory module via a data line and transmits the read data to the upper module.

According to yet another aspect of the present invention, a memory controlling apparatus executes a command, issued by an upper module of a system, to read data from or write data on a memory. The memory controlling apparatus includes: a memory controller which transmits an address and write data via an address line, and receives read data via a data line; and a memory module which separates an address from write data, transmits the address and the write data to a memory buffer and a write data buffer, respectively, writes the data on a memory cell indicated by the address, and transmits data read from a memory to the memory controller via the data line.

The memory controlling apparatus further includes: an address latch which latches address data; a data latch which latches read data or write data; an address and write data queue which sequentially stores an address input from the address latch and write data from the data latch and transmits the stored address and the stored data to a memory module via an address line; and a data queue which sequentially stores read data input from the memory module via a data line and transmits the read data to the upper module.

When writing data in a full-write manner, the write data is divided into bytes, and all the bytes of the write data are sequentially transmitted from the address queue to the memory module at their corresponding addresses.

When writing data in a partial-write manner, only predetermined bytes of data transmitted from the upper module of the system corresponding to specific locations are stored in the address queue and then transmitted to the memory module with their corresponding addresses stored in the address queue.

In an aspect of the present invention, the memory controller comprises: an address latch which latches address data; a data latch which latches read data or write data; an address queue which stores an address input from the address latch and transmits the stored address to a memory module via an address line; a write data queue which stores write data input from the data latch and sequentially transmits the stored write data to the memory module via the address line; and a read data queue which sequentially stores read data input from the memory module via a data line and transmits the read data to the upper module.

When writing data in a full-write manner, the write data is divided into bytes and all the bytes of the write data are sequentially transmitted from the address queue to the memory module at their corresponding address.

When writing data in a partial-write manner, only predetermined bytes of data transmitted from the upper module of the system corresponding to specific locations are stored in the address queue and then transmitted to the memory module with their corresponding addresses stored in the address queue.

In a further embodiment of the present invention, the memory module includes: a column address buffer which stores only column addresses included in address data received via an address line; a row address buffer which stores only row addresses included in the address data; a write data buffer which stores data received via an address line; a memory cell where data stored in the written data buffer is written on a predetermined place indicated by a column address and a row address received from the column address buffer and the row address buffer, respectively, in a data write mode and is read from the corresponding address in a data read mode; and a read data buffer which stores the data read from the memory cell and makes the stored data be transmitted to the memory controller.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
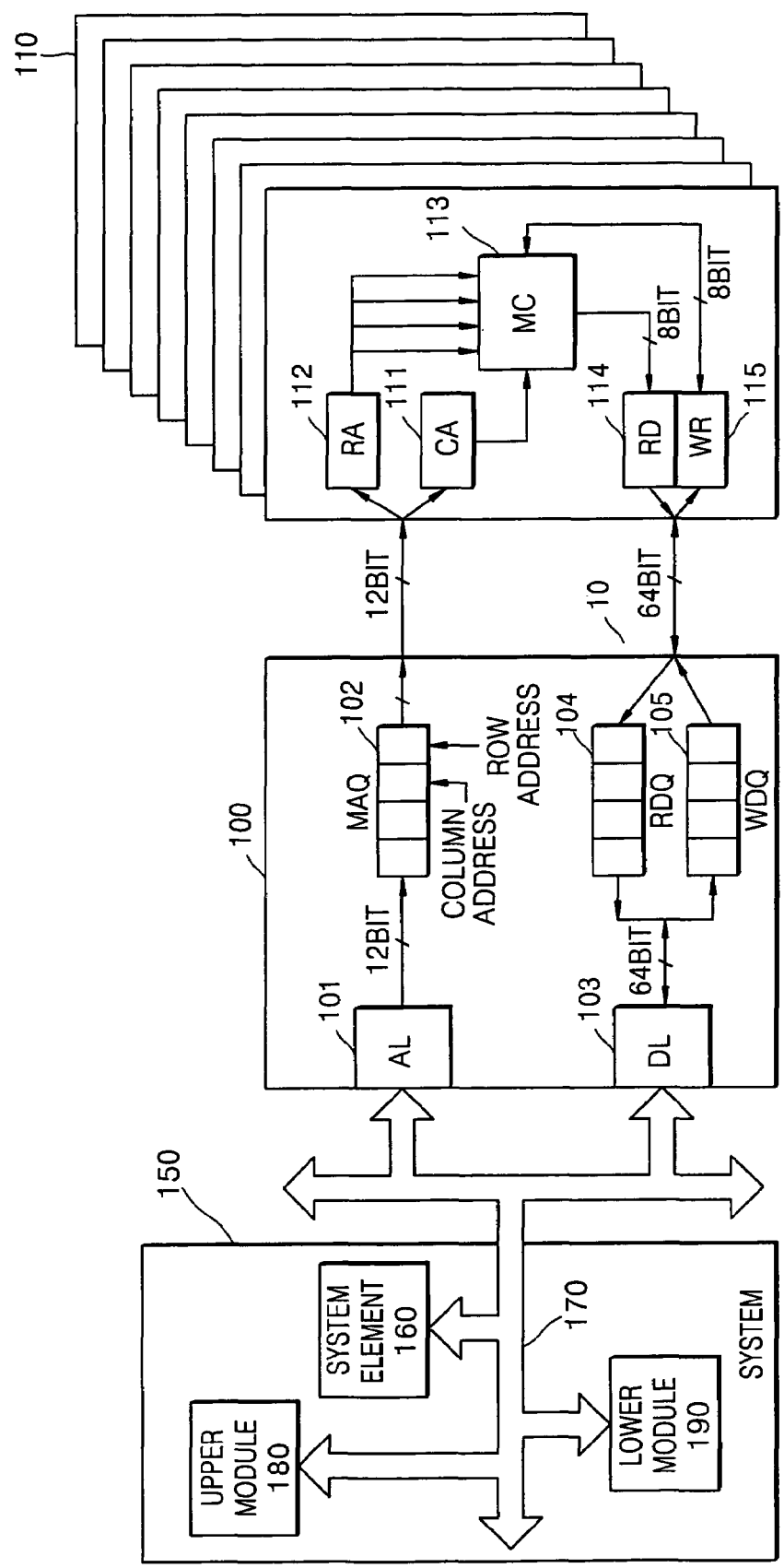
FIG. 1 is a schematic diagram illustrating a conventional memory controller and a memory module for the purpose of showing a method of controlling the access of a DDR SDRAM when writing data on and reading data from the DDR SDRAM.
Figure 2:
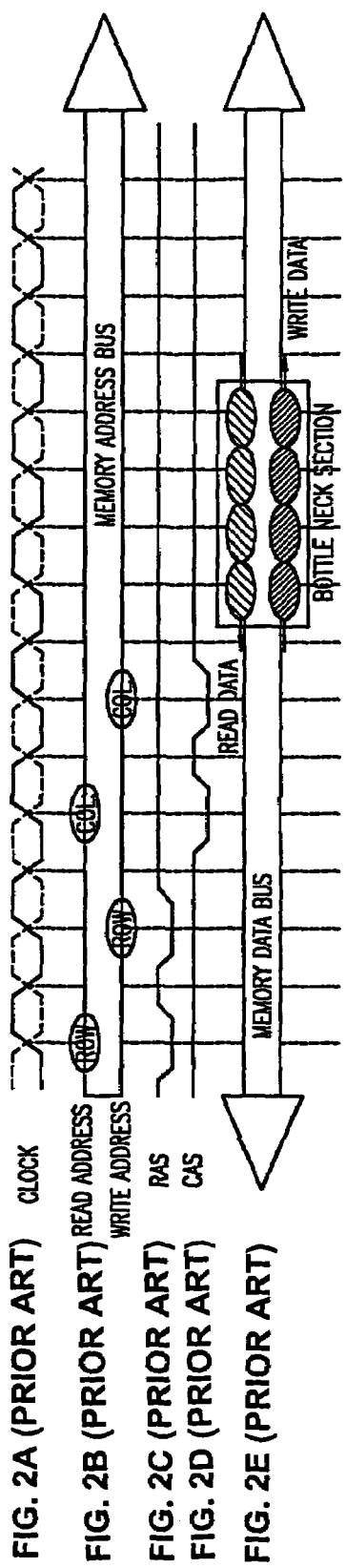
FIGS. 2A through 2E are timing diagrams of signals used in the conventional method of controlling the access of memory when writing data on or reading data from the memory, shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
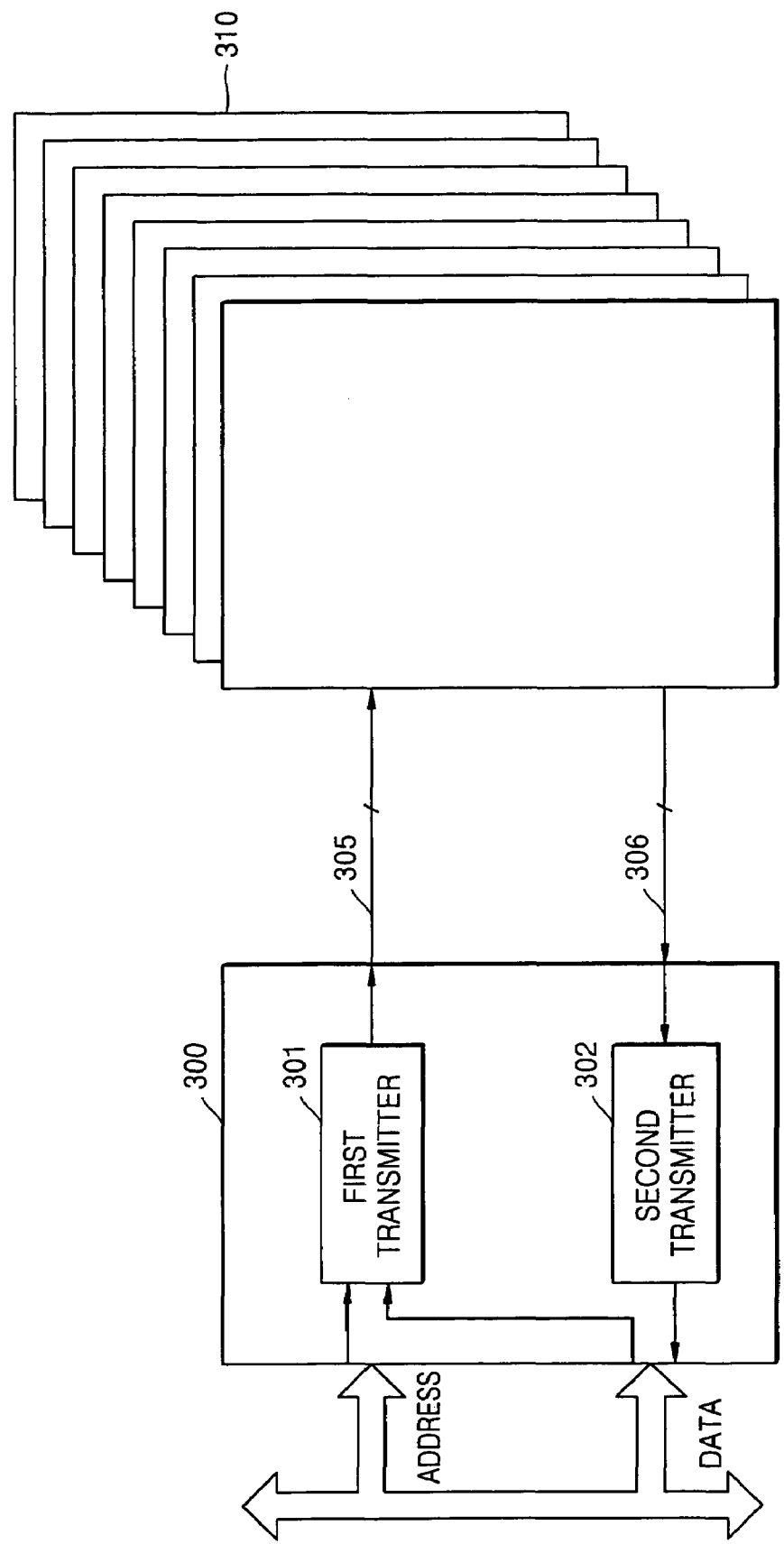
FIG. 3 is a schematic diagram illustrating a memory controlling apparatus according to an embodiment of the present invention.

FIG. 3 is a schematic diagram illustrating a memory controlling apparatus according to an embodiment of the present invention. Referring to FIG. 3, the memory controlling apparatus includes a memory controller 300 which accesses a memory module 310, in response to a command from an upper module (not shown) of a system, and writes data on or reads data from a memory.

The memory controller 300 includes a first transmitter 301 and a second transmitter 302. The first transmitter 301 transmits addresses of data to be read from the memory, (hereinafter, referred to as read data), or addresses of data written in the memory (hereinafter, referred to as write data) along with data to be written in the memory to the memory module 310 via the same address line 305. Here, the write data and the address data can be transmitted from the memory controller 300 to the memory module 310 via the same address line 305. The write data and the address data input into the first transmitter 301 are transmitted from an upper module of a system (not shown) to the memory controller 300.

The second transmitter 302 transmits data read from the memory module 310 to the upper module of a system via a data line 306.

The memory controlling apparatus shown in FIG. 3 processes signals in consideration of the transmission direction of the signals. In particular, write data and a memory address are transmitted to the memory module 310 via an address line 305, and data read from the memory module 310 is transmitted via a data line 306. Thus, even though there is not much of a gap between the time when a read command is transmitted and the time when a write command is transmitted, the read data and the data to be written are prevented from being congested in the same transmission line.

Figure 4:
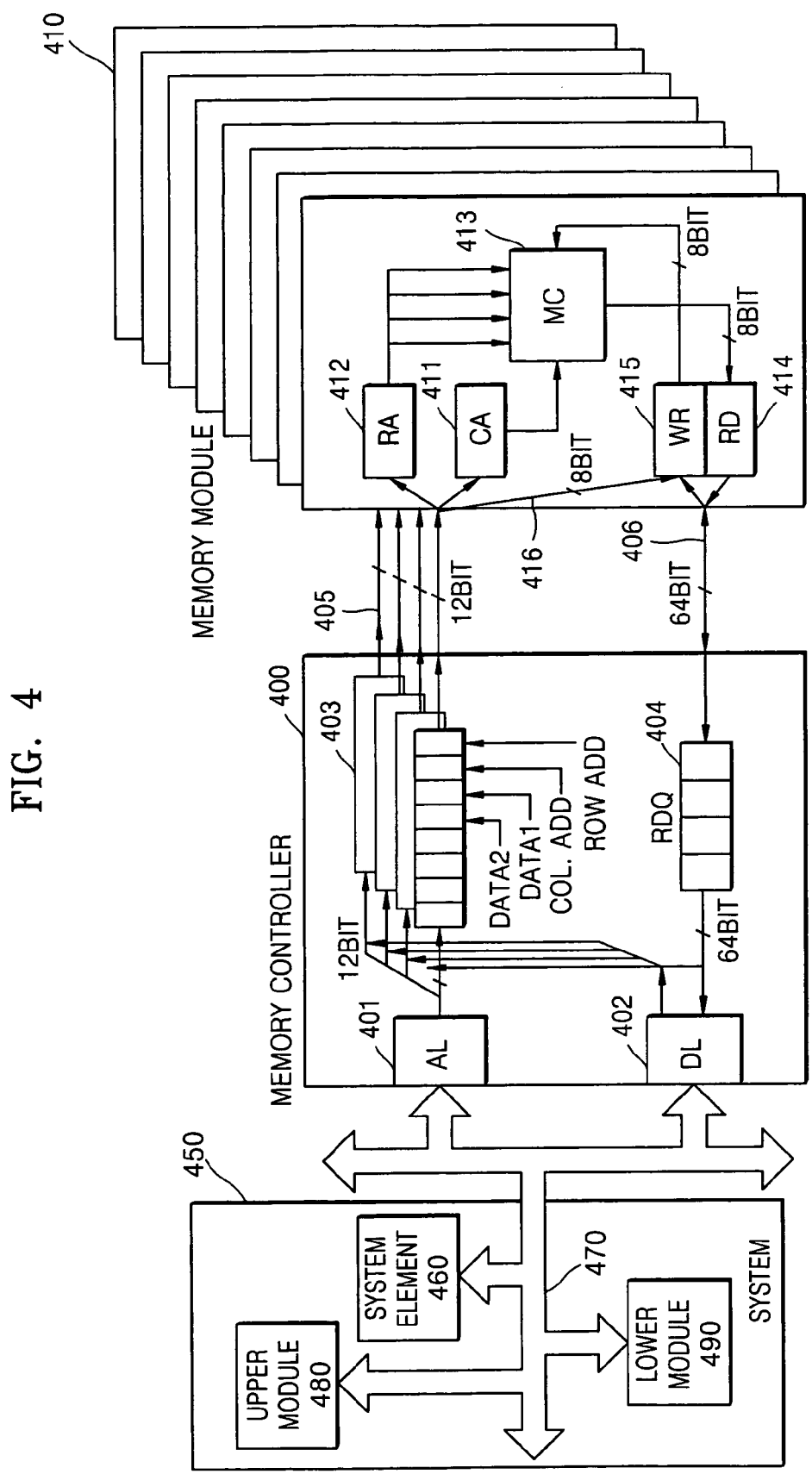
FIG. 4 is a diagram illustrating the memory controlling apparatus as shown in FIG. 3 according to an additional aspect of the present invention.

FIG. 4 is a diagram illustrating a memory controlling apparatus as shown in FIG. 3 according to an additional aspect of the present invention. Referring to FIG. 4, a memory controller of the memory controlling apparatus includes an address latch (AL) 401, a data latch (DL) 402, an address and write data queue 403, and a read data queue (RDQ) 404.

The address latch 401 latches address data input into the memory controller 400 from an upper module 480 of a system 450. A system element 460, the upper module 480, and a lower module 490 are coupled to system bus 470. Examples of a system element 460 include an interface or a central processing unit.

The data latch 402 latches data to be written in the memory module 410, which has been input from the upper module of the system, and data read from the memory module 410, which is to be transmitted to the upper module of the system.

The address and write data queue 403 sequentially stores the address data latched by the address latch 401 and the data to be written latched by the data latch 402 and keeps the address data and the data to be written in a state ready to be transmitted. The address and the data to be written in a standby mode in the address and write data queue 403 are transmitted to the memory module 410 via the address line 405 connecting the memory controller 400 and the memory module 410 according to a memory access protocol given by the system.

The read data queue 404 sequentially stores the read data transmitted from the memory module 410 via the data line 406 connecting the memory controller 400 and the memory module 410 and transmits the stored data to the upper module of the system via the data latch 402.

When writing data in the memory module 410, an address of a place where the data is to be written is stored in the address and write data queue 403 first, and then the data is stored in the address and write data queue 403. Thereafter, the address and the data are sequentially transmitted to the memory module 410 via the address line 405, thus performing the process of writing the corresponding data in the memory module 410.

The structure and functions of the memory module 410 are somewhat similar to those of the memory module 110 shown in FIG. 1. The memory module 410 includes a column address data register (CA) 411 which interprets column address data provided by the memory controller 400, a row address data register (RA) 412 which interprets row address data provided by the memory controller 400, a memory cell 413 which is comprised of a matrix of addresses respectively interpreted by the column address data register 411 and the row address data register 412, a read data buffer (RD) 414 which temporarily stores data read from the memory cell 413, and a write data buffer (WR) 415 which temporarily stores write data. The memory module 410 further includes an additional signal line 416 along which write data input via the address line 405 is transmitted to the write data buffer 415 separately from address data. The write data input via the address line 405 can be separated from the address data by an external micom (not shown) or a predetermined logic circuit (not shown). There can be various manners for storing address data in the memory cell 413 separately from its corresponding write data other than the examples set forth herein.

Figure 5:
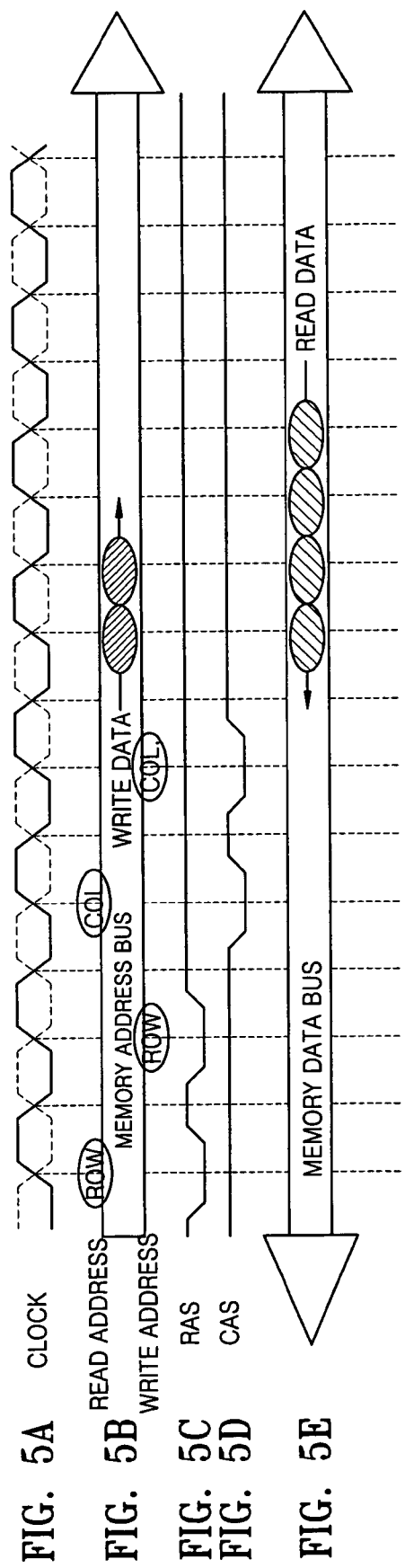
FIGS. 5A through 5E are timing diagrams of signals used to write data on, or read data from, a memory using the memory controller shown in FIG. 4.

FIGS. 5A, 5B, 5C, 5D, and 5E are a timing diagram of signals used to write data on, or read data from, a memory using the memory controlling apparatus shown in FIG. 4. FIG. 5A represents a clock signal generated in a system. When accessing memory, a predetermined memory access protocol is performed in response to the clock signal.

FIG. 5B shows addresses and data transmitted via an address line at predetermined intervals of time according to the predetermined memory access protocol. In particular, FIG. 5B shows a timing pattern of a signal in a case where a data write command is executed directly after a data read command issued by an upper module of the system is executed. In other words, FIG. 5B sequentially shows a row address for read data, a row address for write data, a column address for the read data, a column address for the write data, and the write data. The transmission gap between the row and column addresses of the write data and the write data is determined according to the predetermined memory access protocol.

FIG. 5C shows a row address strobe signal (RAS). A row address is transmitted in response to the row address strobe signal (RAS).

FIG. 5D shows a column address strobe signal (CAS). A column address is transmitted in response to the column address strobe signal (CAS).

FIG. 5E shows data read from a memory module and then transmitted to a memory controller via a data line.

As shown in FIGS. 5A–5E, since write data and read data are transmitted via different transmission lines even when a data read command and a data write command are issued almost at the same time, they can be prevented from colliding with each other or being congested in a single data line.

Figure 6:
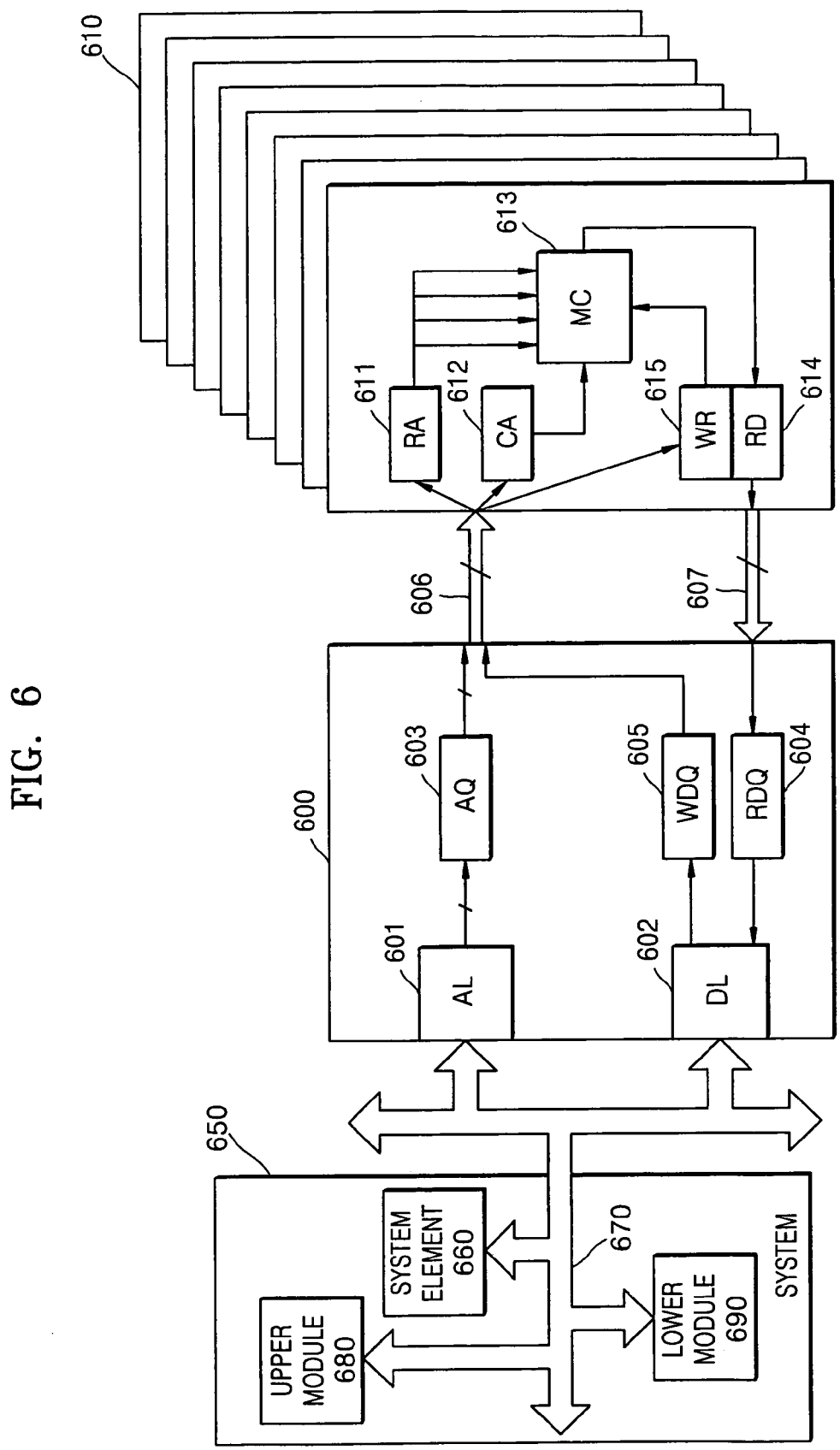
FIG. 6 is a diagram illustrating a memory controlling apparatus according to a second embodiment of the present invention.

FIG. 6 is a diagram illustrating a memory controlling apparatus according to another embodiment of the present invention. Referring to FIG. 6, the memory controlling apparatus includes a memory controller 600. The memory controller 600 includes an address latch (AL) 601, a data latch (DL) 602, an address queue (AQ) 603, a read data queue (RDQ) 604, and a write data queue (WDQ) 605.

The address latch 601 latches address data input into the memory controller 600 from an upper module (not shown) of a system.

The data latch 602 latches data to be written on a memory module 610, which has been input from the upper module of the system, and data read from the memory module 610, which is about to be transmitted to the upper module (not shown) of the system.

The address queue 603 sequentially stores the address data latched by the address latch 601 and keeps the stored data in a state ready to be transmitted to the memory module 610 at a predetermined moment of time via an address line 606.

The read data queue 604 sequentially stores the read data output from the memory module 610 via a data line 607 connecting the memory controller 600 and the memory module 610 and transmits the stored data to the upper module 680 of the system 650 via the data latch 602. A system element 660, the upper module 680, and a lower module 690 are coupled to system bus 670. Examples of a system element 660 include an interface or a central processing unit.

The write data queue 605 sequentially stores the write data latched by the data latch 602 and keeps the stored data in a state ready to be transmitted to the memory module 610. The write data that is in a state ready to be transmitted to the memory module 610 in the write data queue 605 is transmitted to the memory module 610 via the address line 606 connecting the memory controller 600 and the memory module 610 according to a predetermined memory access protocol given by the system.

When writing data in the memory module 610, an address stored in the address queue 603 is transmitted to the memory module 610 via the address line 606 first, and a predetermined amount of time later, write data stored in the write data queue 605 is transmitted to the memory module 610 via the address line 606, thus enabling the write data to be written in the memory module 610.

The structure of the memory module 610 and the timing patterns of signals input into or output from the memory module 610 are similar to the structure of the memory module 410 of FIG. 4 and the timing patterns of signals input into or output from the memory module 410.

Figure 7:
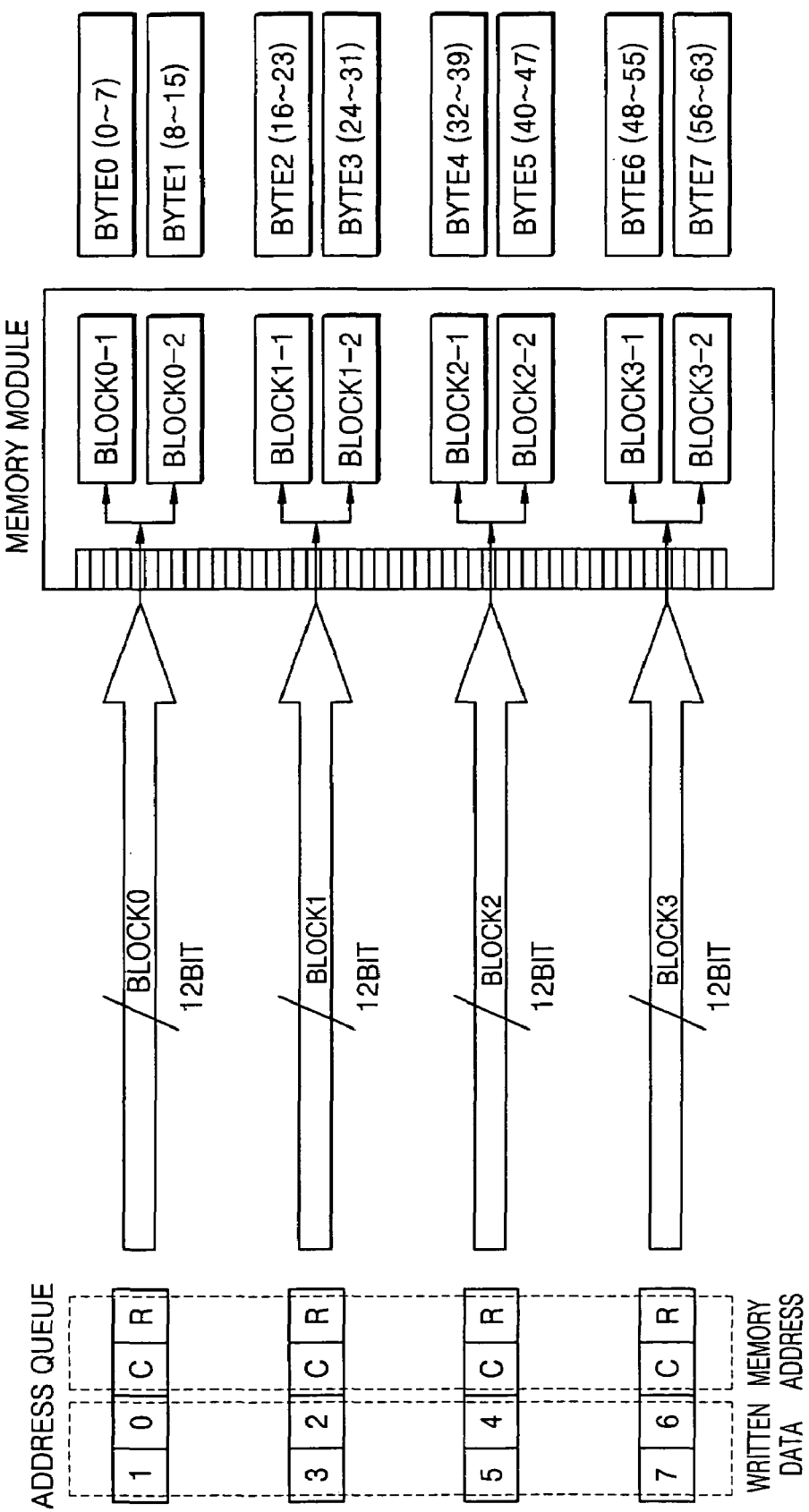
FIG. 7 is a diagram illustrating a method of controlling the writing of data on memory using a memory controlling apparatus according to the present invention.

FIG. 7 is a diagram for illustrating a method of controlling the accessing of a memory when writing data in the memory using a memory controlling apparatus according to an embodiment of the present invention.

Referring to FIGS. 4 and 7, since at times, the address line 405 cannot handle a considerable amount of data due to its limited capacity, the data to be written in a memory needs to be divided into smaller pieces so that all the pieces of the data can be written at a place of an address module indicated by a single address.

The address and write data queue 403 sequentially stores data streams R-C-0-1, R-C-2-3, R-C-4-5, and R-C-6-7 and sequentially transmits the stored data streams R-C-0-1, R-C-2-3, R-C-4-5, and R-C-6-7 to the memory module 410. Here, R represents a row address, and C represents a column address. The numbers 0, 1, 2, 3, 4, 5, 6, and 7 indicate the sequence number of each byte of write data. The four different data streams use the same row and column addresses. FIG. 7 shows a full-write manner in which every two bytes of the write data are transmitted from the address and write data queue 403.

According to a partial-write manner, part of bytes of write data transmitted from an upper module of a system are stored in a predetermined place in the address and write data queue 403 and then transmitted to the memory controller 400.

The present invention in which read data and write data are transmitted via different transmission lines can be effectively applied to memories capable of transmitting data at timings of both up and down edges of a clock signal, such as DDR SDRAMs. In other words, the present invention can execute a read command and almost at the same time as a write command and prevent read data and write data, which are transmitted in different directions, from being congested in a single transmission line by using different transmission lines for the read data and the write data.

When applying the present invention to a DDR SDRAM, the DDR SDRAM will have a high data transmission rate and stably perform a data transmission operation like a Rambus DRAM. In addition, by directly using core elements of a conventional SDRAM, manufacturing costs can be prevented from rising unnecessarily.

In short, according to the present invention, it is possible to prevent read data and write data from being congested when accessing memory by using different transmission lines for the read data and the write data, and thus a high transmission rate and stable transmission performance can be achieved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A memory controlling apparatus comprising:
    a memory module;
    an address line;
    a data line;
    a first transmitter which transmits an address of read data, and an address of write data along with the write data to the memory module via the address line; and
    a second transmitter which transmits data read from the memory module via the data line.

2. The memory controlling apparatus according to claim 1, wherein the memory controlling apparatus receives a command from an upper module to read data from the memory module, or to write data to the memory module, and controls the accessing of the memory module according to the command.

3. The memory controlling apparatus according to claim 2, wherein the second transmitter transmits data read from the memory module to the upper module via the data line.

4. The memory controlling apparatus of claim 2, wherein:
    the first transmitter includes an address queue which sequentially stores the address of the read data, or the write data and the write data, and keeps the stored address and the stored data in a state ready to be transmitted to the memory module, and
    the second transmitter includes;
        a write data queue which sequentially receives data from the upper module of the system, stores the received data, and keeps the stored data in a state ready to be transmitted to the memory module via the address line, and
        a read data queue which sequentially stores read data received from the memory module via a data line and transmits the stored read data to the upper module.

5. The memory controlling apparatus of claim 4, wherein when writing data, addresses stored in the address queue are transmitted to the memory module via the address line, and then data stored in the write data queue is transmitted to the memory module via the address line.

6. The memory controlling apparatus of claim 5, wherein when writing data in a full-write manner, the write data is divided into bytes and the bytes are then sequentially transmitted from the address queue to the memory module at their corresponding addresses.

7. The memory controlling apparatus of claim 5, wherein when writing the write data in a partial-write manner, predetermined bytes of data, that correspond to specific locations, are;
    transmitted from the upper module,
    stored in the address queue, and
    then transmitted to the memory module according to corresponding addresses that have been stored in the address queue.

8. The memory controlling apparatus of claim 1, wherein the second transmitter includes a data queue which sequentially receives and stores data read from the memory module and keeps the stored data in a state ready to be transmitted to the upper module of the system.

9. A memory controlling apparatus comprising:
    a memory module;
    an address line;
    a data line;
    a first transmitter which transmits an address of read data, or an address of write data along with the write data to the memory module via the address line; and
    a second transmitter which transmits data read from the memory module via the data line, wherein the first transmitter's transmission of an address of read data, or an address of write data along with the write data to the memory module via the address line, and the second transmitter's transmission of data read from the memory module via the data line are performed contemporaneously without causing a data bottleneck.

10. A memory controlling apparatus comprising:
a memory module;
an address line;
a data line;
a first transmitter which transmits an address of read data, or an address of write data along with the write data to the memory module via the address line; and
a second transmitter which transmits data read from the memory module via the data line,
wherein the read data and the write data are transmitted at both up and down edges of a clock signal.

11. The memory controlling apparatus according to claim 10, wherein the memory module comprises DDR SDRAMs.

12. A memory controlling apparatus comprising:
a memory module;
an address line;
a data line;
a first transmitter which transmits an address of read data, or an address of write data along with the write data to the memory module via the address line; and
a second transmitter which transmits data read from the memory module via the data line,
wherein the first transmitter comprises an address queue which sequentially stores the address of the read data, or the address of the write data and the write data, and keeps the stored address and the stored data in a state ready to be transmitted to the memory module.

13. A memory controlling apparatus comprising:
a memory module;
an address line;
a data line;
a first transmitter which transmits an address of read data, or an address of write data along with the write data to the memory module via the address line; and
a second transmitter which transmits data read from the memory module via the data, wherein:
the first transmitter comprises an address queue, wherein when writing the write data,
the memory controlling apparatus stores the address of the write data in the address queue,
then stores the write data in the address queue, and
then sequentially transmits the stored address and the stored data to the memory module via the address line.

14. The memory controlling apparatus of claim 13, wherein when writing the write data in a full-write manner, the write data is divided into bytes, and the bytes are sequentially transmitted from the address queue to the memory module at their corresponding addresses.

15. The memory controlling apparatus of claim 13, further comprising an upper module of the system, wherein when writing data in a partial-write manner, predetermined bytes of data, transmitted from the upper module and corresponding to specific locations, are stored in the address queue and are then transmitted to the memory module according to the addresses stored in the address queue.

16. A memory controlling apparatus which receives, from an upper module of a system, a command to read data from a memory module or to write data in the memory module, and controls accessing the memory module in response to the command, the memory controlling apparatus comprising:
an address line;
a data line;
an address latch which latches address data;
a data latch which latches read data or write data;
an address and write data queue which;
sequentially stores,
an address, input from the address latch, and
the write data, from the data latch, and
transmits the stored address and the stored data to the memory module via the address line; and
a data queue which sequentially stores the read data, input from the memory module via the data line, and transmits the read data to the upper module.

17. A memory controlling apparatus which receives, from an upper module of a system, a command to read data from a memory module or to write data in the memory module, and controls accessing the memory module in response to the command, the memory controlling apparatus comprising:
an address line;
a data line;
an address latch which latches address data;
a data latch which latches read data or write data;
an address queue which stores an address input from the address latch and transmits the stored address to the memory module via the address line;
a write data queue which stores the write data input from the data latch and sequentially transmits the stored write data to the memory module via the address line; and
a read data queue which sequentially stores the read data input from the memory module via the data line and transmits the read data to the upper module.

18. A memory controlling apparatus comprising:
an address line;
a data line;
a memory;
a memory controller which transmits an address and write data via the address line and receives read data via the data line; and
a memory module comprising:
a memory buffer; and
a write data buffer;
wherein the memory module:
separates an address from the write data;
transmits the address to the memory buffer and the write data to the write data buffer;
writes the data on a memory cell indicated by the address; and
transmits data read from the memory to the memory controller via the data line.

19. The memory controlling apparatus according to claim 18, further comprising an upper module, wherein the memory controlling apparatus receives a command from the upper module to read the read data from the memory module, or to write the write data to the memory module, and controls the accessing of the memory module according to the command.

20. The memory controlling apparatus of claim 19, wherein the memory controller comprises:
a memory module;
an address latch which latches address data;
a data latch which latches the read data or the write data;

an address and write data queue which sequentially stores an address input from the address latch and the write data from the data latch and transmits the stored address and the stored data to the memory module via the address line; and a data queue which sequentially stores the read data input from the memory module via the data line and transmits the read data to the upper module.

21. The memory controlling apparatus of claim 20, wherein when writing the write data in a full-write manner, the write data is divided into bytes and the bytes are sequentially transmitted from the address queue to the memory module at their corresponding addresses.

22. The memory controlling apparatus of claim 20, wherein when writing the write data in a partial-write manner, predetermined bytes of data that correspond to specific locations are:

transmitted from the upper module of the system; stored in the address queue; and transmitted to the memory module along with corresponding addresses stored in the address queue.

23. The memory controlling apparatus of claim 18, wherein the memory controller comprises:

an address latch which latches address data;

a data latch which latches the read data or the write data;

an address queue which stores an address input from the address latch and transmits the stored address to a memory module via an address line;

a write data queue which stores the write data input from the data latch and sequentially transmits the stored write data to the memory module via the address line; and a read data queue which sequentially stores the read data input from the memory module via a data line and transmits the read data to the upper module.

24. The memory controlling apparatus of claim 23, wherein when writing data in a full-write manner, the write data is divided into bytes and the bytes are sequentially transmitted from the address queue to the memory module at their corresponding addresses.

25. The memory controlling apparatus of claim 23, wherein when writing the write data in a partial-write manner, predetermined bytes of data that correspond to specific locations are transmitted from the upper module of the system, the bytes of data are then stored in the address queue, before being transmitted to the memory module with their corresponding addresses stored in the address queue.

26. The memory control apparatus of claim 18, wherein the memory module further comprises:

a column address buffer which stores column addresses included in address data received via the address line;

a row address buffer which stores only row addresses included in the address data;

a write data buffer which stores data received via the address line;

a memory cell where data stored in the written data buffer is written on a predetermined place indicated by a column address and a row address received from the column address buffer and the row address buffer, respectively, in a data write mode and is read from the corresponding address in a data read mode; and a read data buffer which stores the data read from the memory cell and transmits the stored data to the memory controller.

27. A memory controlling apparatus comprising:

a memory module;

a memory controller;

a first transmission line, which transmits column address, row address, and/or write data from the memory controller to the memory module, and which does not transmit read data from the memory module; and a second transmission line, which transmits only read data from the memory module to the memory controller.

28. A memory controlling apparatus which receives, from an upper module of a system, a command to read data from a memory module or to write data in the memory module, and controls accessing the memory module in response to the command, the memory controlling apparatus comprising:

an address line, which transmits column address, row address, and/or write data to the memory module, and which does not transmit read data from the memory module; and a data line, which transmits only read data from the memory module.

* * * * *